United States Patent [19]

Siegel et al.

[11] Patent Number: 5,022,716
[45] Date of Patent: Jun. 11, 1991

[54] BRAKE SYSTEM

[75] Inventors: Heinz Siegel, Stuttgart; Klaus Mueller, Tamm, both of Fed. Rep. of Germany

[73] Assignee: Robert Bosch GmbH, Stuttgart, Fed. Rep. of Germany

[21] Appl. No.: 437,863

[22] Filed: Nov. 17, 1989

[30] Foreign Application Priority Data

Dec. 28, 1988 [DE]  Fed. Rep. of Germany ....... 3844068

[51] Int. Cl.$^5$ ............................. B60T 8/58; B60T 8/44
[52] U.S. Cl. ..................................... 303/104; 303/114
[58] Field of Search ................... 303/9.72, 68, 69, 92, 303/113, 114, 116, 119, 100, 95, 104, 101, 115

[56] References Cited

U.S. PATENT DOCUMENTS

| | | | |
|---|---|---|---|
| 3,871,717 | 3/1975 | Jensen | 303/115 |
| 3,993,365 | 10/1976 | Kondo | 303/115 |
| 4,462,642 | 7/1984 | Leiber | 303/119 |
| 4,678,243 | 7/1987 | Leiber | 303/114 |
| 4,678,243 | 7/1987 | Leiber | 303/114 |
| 4,776,646 | 11/1988 | Seigel | 303/114 |
| 4,824,186 | 4/1989 | Leiber et al. | 303/100 |

FOREIGN PATENT DOCUMENTS 3717547 12/1988 Fed. Rep. of Germany .
2205134 11/1988 United Kingdom .

OTHER PUBLICATIONS

Related Application: U.S. Ser. No.: 196,843/Leiber.

Primary Examiner—Robert J. Oberleitner
Assistant Examiner—Alfred Muratori
Attorney, Agent, or Firm—Edwin E. Greigg; Ronald E. Greigg

[57] ABSTRACT

A brake system having a master brake cylinder embodied as an electrohydraulic booster, this cylinder communicates via a piston rod with a brake pedal. The piston rod acts upon at least one master cylinder piston, via which in turn a brake chamber can be put at brake pressure. As a result, brake fluid flows via brake lines to corresponding wheel brake cylinders. Also associated with the master cylinder piston is a servo piston chamber, which communicates via a control element with an apparatus for supplying power brake fluid. This control element is controlled via a controller. The controller controls the control deviation, which is derived from a set-point value forced by a piston rod travel transducer having a following control unit, and from the actual value, which originates in a travel transducer of the master cylinder piston. As a function of the rod travel the control unit following the piston rod travel transducer generates set-point value indications, which are intended to move the master cylinder piston in accordance with the driver's braking behavior. From the travel transducer signal of the piston rod transducer, via a performance graph, the feedback of the brake pressure to the piston rod is also derived and converted, so that the driver on the one hand can feed in pressure slowly and purposefully without feedback, until automatically, with increasing pressure, or in other words with a corresponding rod travel, the feedback of the brake pressure to the driver's foot begins, and on the other hand, rapid braking is effected with immediate feedback to the driver's foot.

33 Claims, 6 Drawing Sheets 5,022,716

BRAKE SYSTEM

BACKGROUND OF THE INVENTION

The invention relates to a brake system having a master brake cylinder embodied as an electrohydraulic booster, as defined herein.

German patent application P 38 42 225.5, which is the same as copending U.S. application Ser. No. 424,648 filed Oct. 20, 1989, describes a brake system by means of which the feeding of servo fluid is controlled by two travel transducers, one of which senses the motion of the piston rod and the other of which senses the motion of the master cylinder piston. From a great number of tests, it is known that the brake characteristic curve, that is, the characteristic curve of pedal force over pedal travel, should be adaptable to a desired deceleration. Slow braking startup requires a long pedal travel, or in other words a soft pedal, so that the deceleration can be metered out properly. In fast braking startup, contrarily, high pressure should be fed in with short pedal travel, and a higher pedal force should be realized by the driver to enable attaining fast deceleration.

Moreover, in many cases a so-called quick speed-change is desired; that is, if the servo circuit fails, it should still be possible to attain the highest possible brake pressure using the master brake cylinder. As a rule, this high brake pressure leads to embodying a master cylinder piston of relatively small diameter. On the other hand, during normal servo operation, the greatest possible braking volume (brake energy) should be available, which once again means that a larger diameter of the master cylinder piston is desirable.

OBJECT AND SUMMARY OF THE INVENTION

With a brake system as defined herein, it is possible to execute virtually any desired braking characteristic curve. In the first travel transducer, the pedal travel generates a voltage that is converted in a suitable control unit into a set-point value for a voltage of the actual-travel transducer at the master cylinder piston. This voltage is then present at a summation point, in which the set-point value is compared with the actual voltage value ascertained by the second travel transducer. Depending on how high the difference between the two values is, an appropriate controller is activated, which in turn triggers a control element and sets the delivery of power brake fluid into motion.

However, a particular advantage of the invention is that between the piston rod and the master brake cylinder, as a result of the pedal pressure, a relative motion takes place in a chamber that communicates, via suitable longitudinal or radial bores in the piston rod, with a pressure controller that on the other end is incorporated into the supply line for power brake fluid. As a result, there is a direct influence on the brake force exerted by the driver's foot, in that the feedback is adjusted via this triggerable pressure controller.

The pressure on the master cylinder piston acting as a servo piston is thus decoupled from the actual brake pressure on the piston rod.

If slow braking startup is sensed by means of the first travel transducer, which is coupled to the piston rod, then a corresponding characteristic curve assigns the piston rod a shorter travel in the master cylinder piston. The attendant spacing must be designed to suit this purpose, and the metering is effected by the aforementioned comparison of set-point and actual values.

If fast braking startup is occurring, then this is likewise sensed by the two travel transducers. The characteristic curve for gradual braking startup is not taken into account; instead, braking is effected with the characteristic curve for relatively high pedal speed. In that case, the master cylinder piston preferably executes the same travel as the piston rod, or an even longer travel in response to the feeding of power brake fluid.

If the servo system fails, the master cylinder piston is displaced by the piston rod. It therefore suffices for the diameter of the master cylinder piston to be designed for the emergency operation situation; that is, it may have a relatively small diameter. For normal operation, i.e. with functioning of the servo system, a correspondingly longer stroke should be provided at the master cylinder piston, so that a quick speed-change can take place without difficulty.

With this electrohydraulic booster according to the invention, having two travel transducers, virtually any arbitrary characteristic braking curve can be executed. To do so, the electronic system need merely be provided with appropriate performance curves.

Both a quick speed-change and the change from one characteristic braking curve to another can be accomplished in simple fashion by means of a longer master brake cylinder stroke and by means of the spacing between the piston rod and the master brake cylinder, as well as by electronics having suitable characteristic curves. The variable pedal feedback by means of the electrically triggerable pressure controller is a particularly important feature.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
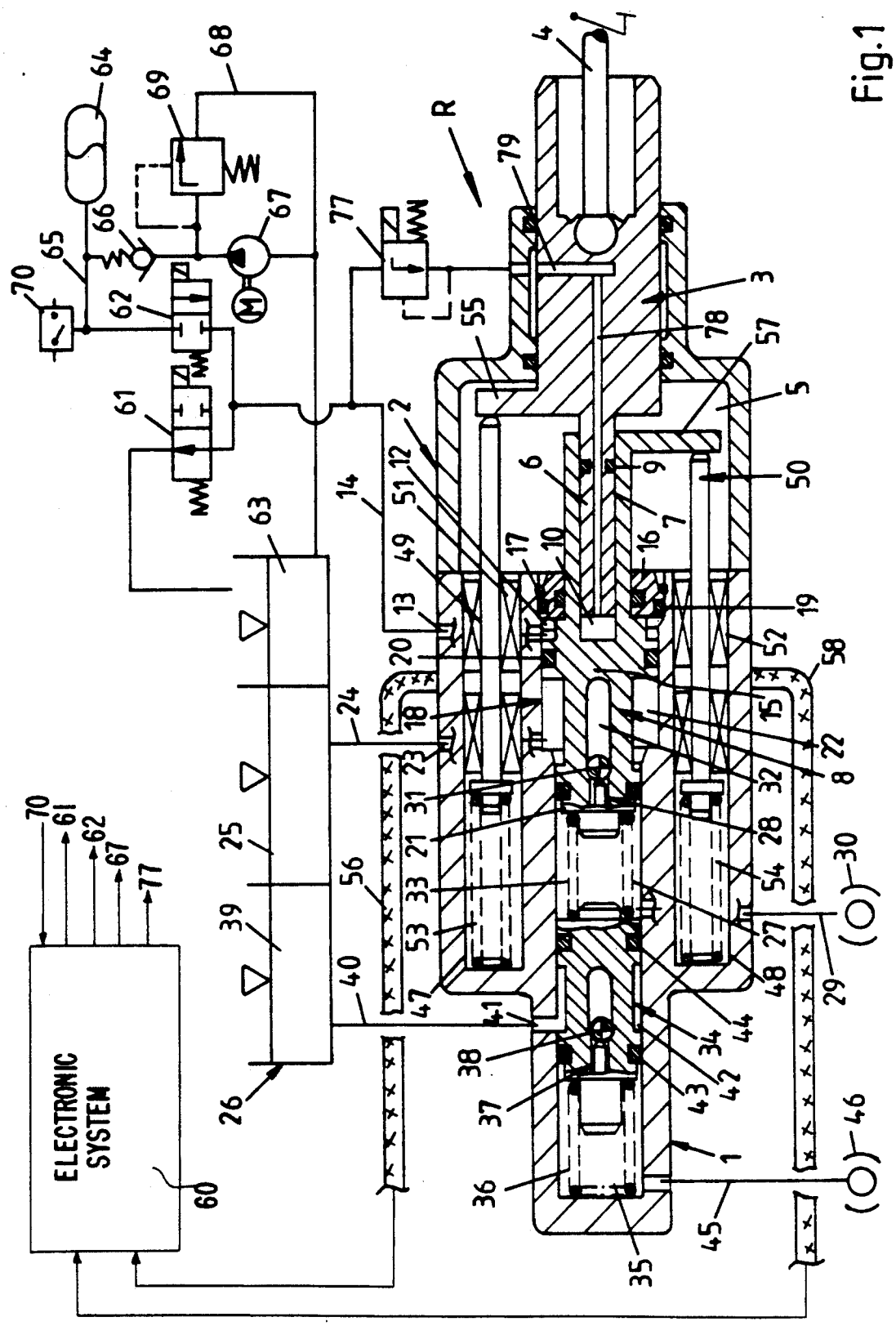
FIG. 1 is a longitudinal section through an electrohydraulic booster according to the invention, with a portion of the brake system shown in the form of a block diagram.

An electrohydraulic booster R as shown in FIG. 1 has a master cylinder housing 1 and a closure housing 2. A piston rod 3 extends into the closure housing 2 and is operatively connected via a flanged-in pivot rod 4 to a brake pedal. The pedal motion is transmitted by the vehicle operator to the piston rod 3 via this pivot rod 4.

Inside the closure housing 2, in an inner chamber 5 formed by the closure housing 2, the piston rod 3 with a tappet 6 engages an axial bore 7 of a master cylinder piston 8 and slides in this axial bore 7, which is sealed off from the inner chamber 5 by a sealing ring 9.

By means of the tappet 6, a variable-volume chamber 10 is formed in the axial bore 7. A servo piston chamber 12 surrounds the master cylinder piston 8 and can be acted upon by brake fluid through an inlet fluid pressure line 14, via a suitable radial bore 13 in the master cylinder housing 1.

The servo piston chamber 12 is also defined between a piston ring portion 15 of the master cylinder piston 8 and a guide bushing 16; the guide bushing 16 is retained by a snap ring 17 in a stepped bore 18 of the master cylinder housing 1. Both the piston ring portion 15 and the guide bushing 16 have corresponding sealing rings 19 and 20 sealing them from the stepped bore 18.

An annular chamber 22 is formed between the piston ring portion 15 and the actual brake piston portion 21 of the master cylinder piston 8 and communicates via a corresponding bore 23 and a line 24 with a chamber 25 of a supply tank 26 for brake fluid. Via this bore 23, and annular chamber 22 brake fluid is carried from the supply tank 26 via a central valve 28 in the master cylinder piston into a first brake chamber 27. When pressure is exerted upon the master cylinder piston 8, the central valve 28 closes, so that the brake fluid present in the first brake chamber 27 can flow via a brake line 29 to various wheel brake cylinders 30, shown schematically in the drawing. When the brake pressure lets up, the central valve 28 is kept open in a known manner by a pin 31, so that the brake fluid, which may be under pressure, can flow back into the first brake chamber 27 via the bore 23 and a corresponding slit 32, in which the pin 31 also slides, and via the central valve 28.

Toward the face end, the master cylinder piston 8 is supported via a restoring spring 33 in the first brake chamber 27 against a further master cylinder piston 34, which is likewise slidably supported in the stepped bore 18. With the master cylinder housing 1, this master cylinder piston 34 defines a second brake chamber 35, and a restoring spring 36 is likewise provided in this second brake chamber 35. This master cylinder piston 34 likewise has a central valve 37, which is embodied similarly to the central valve 28. This central valve 37 is likewise kept open in a known manner, in the outset position of the piston 34, by a pin 38.

Via this central valve 37, the second brake chamber 35 can be supplied with brake fluid from a further brake fluid chamber 39 of the tank 26; to this end, a corresponding line 40 and a bore 41 connects with an annular chamber 42, which is located between two piston ring portions of the master cylinder piston 34. These piston ring portions are braced against the stepped bore 18 via suitable sealing rings 43 and 44.

The second brake chamber also communicates via a corresponding brake line 45 with wheel brake cylinders 46.

Further blind bores 47 and 48 are provided axially parallel with the stepped bore 18, and sliding in each blind bore is a respective inductive transducer 49 and 50. Each inductive transducer 49 and 50 is surrounded by corresponding coil packets 51 and 52, and each inductive transducer 49 and 50 is supported on an end via a corresponding compression spring 53 and 54, respectively.

The inductive transducer 49 meets a radial extension 55 of the piston rod 3, so that the radial extension 55 and inductive transducer 49 moves with the motion of the piston rod. With movement of the radial extension and inductive transducer 49, an output signal is generated and fed via an electrical line 56 to an electronic system to be described hereinafter.

The other inductive transducer 50, contrarily, meets a radial stop 57 of the master cylinder piston 8 inside the inner chamber 5. Via movement of the radial stop and inductive transducer 50, an output signal is likewise generated for the aforementioned electronic system via an electrical line 58.

The electronic system 60 to be described hereinafter triggers two magnetic valves 61 and 62; the magnetic valve 61 can connect the inlet line 14 to a further chamber 63 of the tank 26 for brake fluid, while the magnetic valve 62 establishes a connection to a pressure reservoir 64 for brake fluid under pressure. A feed pump 67 is also incorporated, via a one-way check valve 66, into the connecting line 65 between the pressure reservoir 64 and the magnetic valve 62, and by means of this feed pump, brake fluid can be pumped out of the chamber 63 to the pressure reservoir 64, or directly to the inlet line 14 via the valve 62. For safety reasons, the feed pump 67 is surrounded by a bypass 68 having a pressure limiting valve 69.

The mode of operation of the booster R according to the invention is as follows:

If a braking motion is initiated, the piston rod 3 moves to the left by the force of the pivot rod 4 and adjusts the inductive transducer 49 counter to the pressure of the compression spring 53. As a result, an output signal is transmitted over the electrical line 56 to the electronic system 60, which in turn sends a signal to magnetic valves 61 and 62 that closes the magnetic valve 61 and opens the magnetic valve 62. This prevents fluid flow via magnetic valve 61 and causes brake fluid that is under pressure to flow out of the pressure reservoir 64 into the inlet line 14 via magnetic valve 62, through the radial bore 13 into the servo piston chamber 12. As a result, the master cylinder piston 8 acting as a servo piston is displaced to the left.

With the motion of the master cylinder piston 8, the second inductive transducer 50 is adjusted, which in turn, via its electrical line 58, generates a signal corresponding to the position of the master cylinder piston 8 acting as a servo piston to the electronic system. If the travel of the master-cylinder piston matches the predetermined travel of the piston rod (pedal travel), then both magnetic valves 61 and 62 are moved to the holding position, i.e., the closing position.

Upon an ensuing reduction in the brake pressure, the magnetic valve 61 is opened via the electronic system, while the magnetic valve 62 stays in its closing position. Brake fluid can now flow out of the servo piston chamber 12 back into the chamber 63 of the tank 26 via the inlet line 14. As a result, a restoration of the master cylinder piston 8 is possible.

It is self-evident that the inductive transducers 49 and 50 are merely examples; two potentiometers could be used instead of these inductive transducers 49 and 50. The stationary transmission behavior of the measuring transducers may be either linear or nonlinear. The embodiment of the two inductive transducers is selected such that the coil packets 51 and 52 are embodied as stationary and need not execute any movement.

For traction control (ASR), the magnetic valve 62 is triggered. As a result, brake fluid then flows out of the pressure reservoir 64, or via the feed pump 67, into the inlet line 14 and from there into the servo piston chamber 12. The pressure buildup in the servo piston chamber 12 causes an adjustment of the master cylinder piston 8 toward the left, so that corresponding brake fluid can flow through the brake lines 29 and 45 to the wheel brake cylinders 30 and 46.

Figure 3:
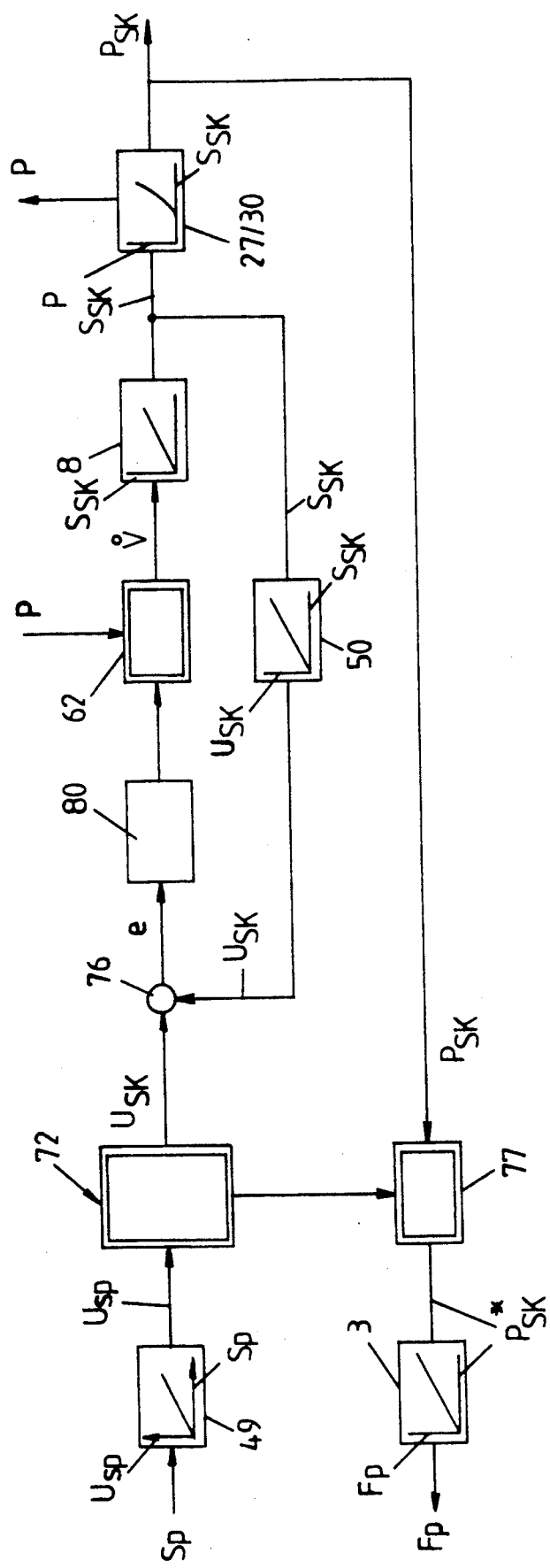
FIG. 3 is a block diagram of an open- and closed-loop control unit for the booster of FIG. 1.

FIG. 3, in a block circuit diagram, which shows a corresponding exemplary embodiment for an open-and closed-loop control unit for the booster R. By means of a potentiometer or the inductive transducer 49, a pedal travel sp is transmitted to the inductive transducer 49 via the radial extension 55. This pedal travel sp is converted into the voltage $U_{sp}$.

Figure 4:
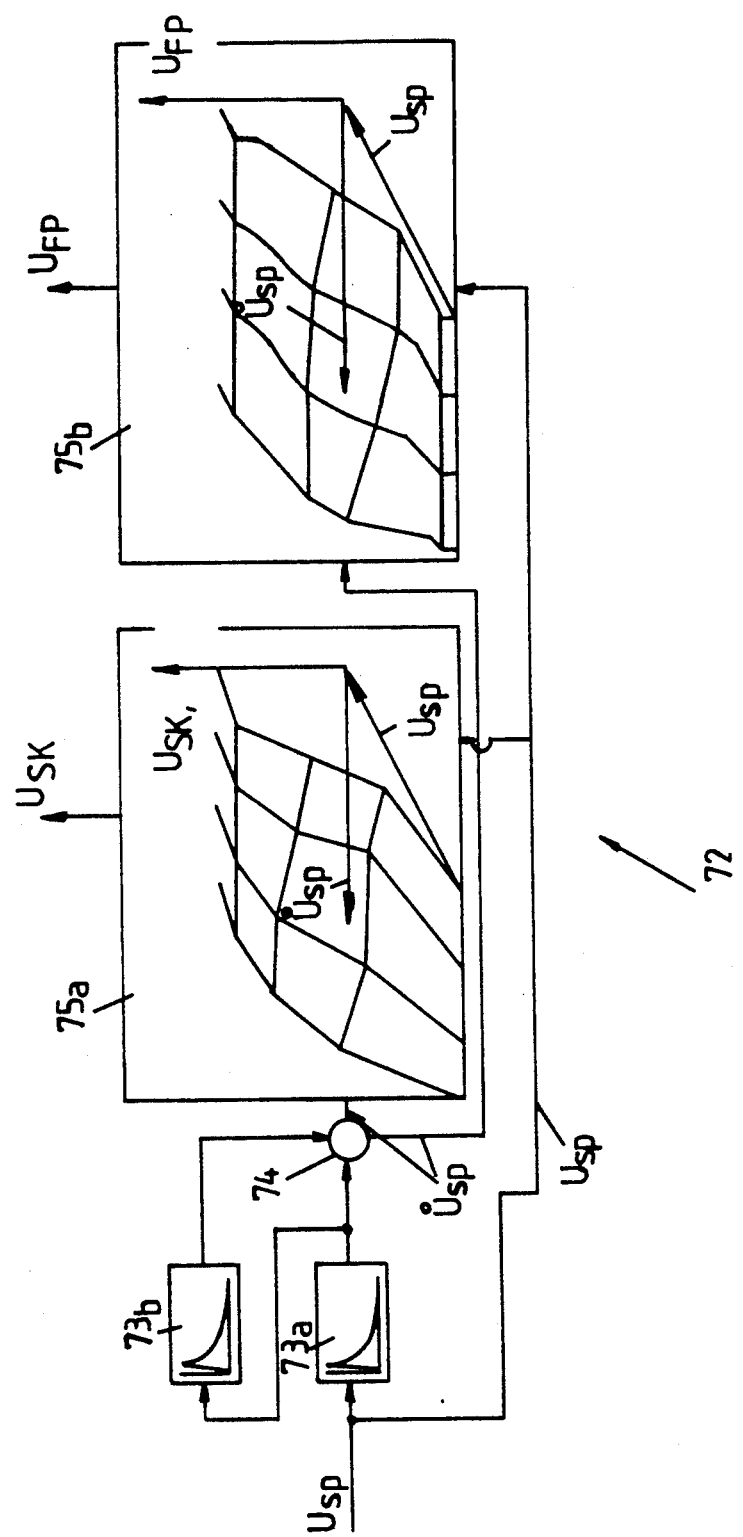
FIG. 4, on a larger scale, shows an element of the open- and closed-loop control unit of FIG. 3.

Via the electrical line 56, this signal $U_{sp}$ is delivered to the control unit 72. The conversion of the pedal travel voltage $U_{sp}$ into the set-point value $U_{SK,soll}$ for the piston rod travel and the control value $U_{FP}$ for the pedal piston force takes place in this control unit 72 (see FIG. 4).

The voltage $U_{sp}$ as a magnitude for the pedal travel sp is differentiated once and twice, respectively, in the differentiators 73a and 73b. The output signal from the second differentiator 73b is added in the summation point 74, with a signal to be determined or else a signal that is adjustable as a function of the brake system, to the output signal of the differentiator 73b, and is transmitted as the differentiation signal $U_{sp}$ to the performance graph element 75a and 75b. As a further input signal, the two performance graph elements 75a and 75b receive the voltage $U_{sp}$ for the pedal travel and from the two input signals at every instant form a set-point signal $U_{SK,soll}$ for the servo piston travel and $U_{FP}$ for the pedal force.

Figure 5:
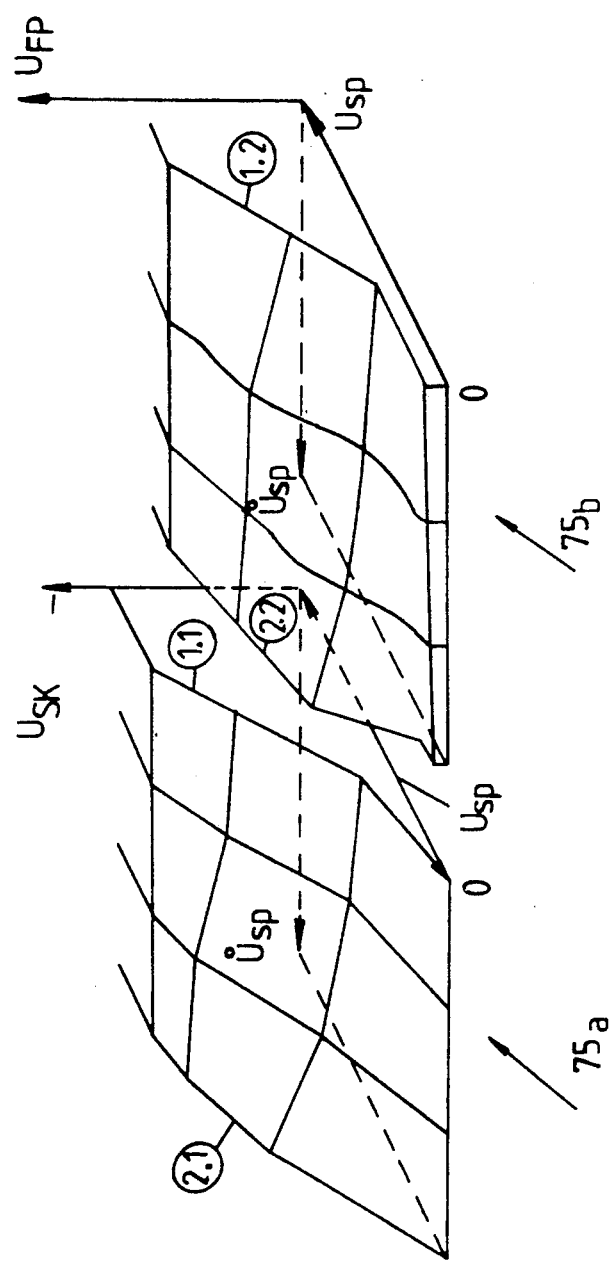
FIG. 5 shows a performance graph on the left for the set-point voltage of the piston rod travel, and a performance graph on the right for the pedal (feedback) force.
Figure 6:
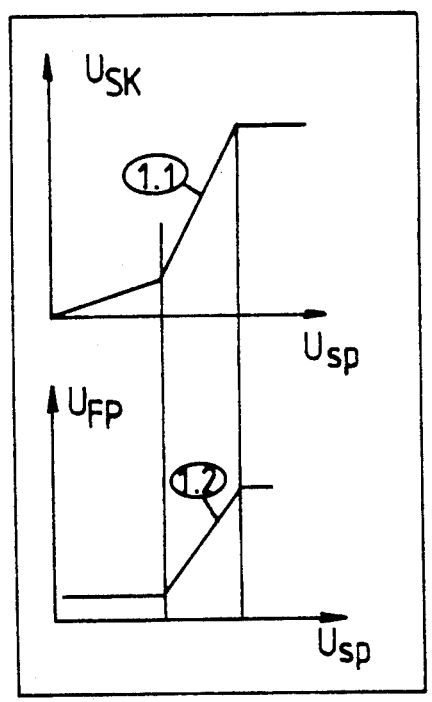
FIG. 6 is a diagram showing the process in the case of slow braking startup.

In slow braking startup (with $U_{sp}$ low), the characteristic curve 1.1 is taken (see FIGS. 5 and 6), which embodies a progressive braking startup (until the shutoff); see FIG. 6. This is associated with the corresponding pedal force characteristic curve 1.2, which initially has a control phase without pedal feedback and with a longer pedal travel builds up an increasing pedal force until the triggering point is reached. There, the specified set point remains constant; the actual pedal force, as is well known, increases markedly.

Figure 7:
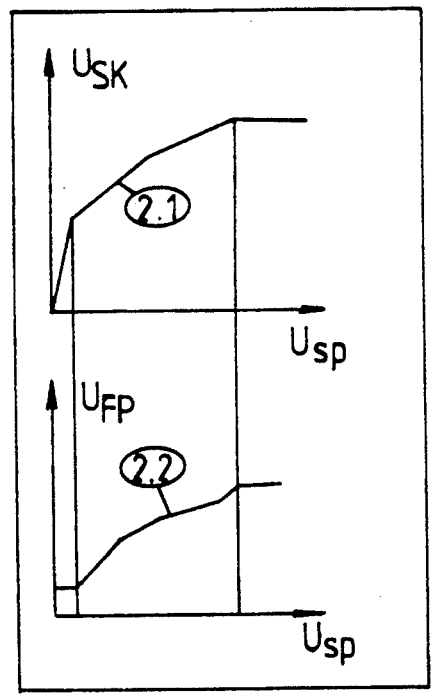
FIG. 7 is a diagram showing the process in the case of fast braking startup.

Fast braking startup leads to a high value for $U_{sp}$; that is, the selection of a characteristic curve shifted to the left in the performance graphs 75a and 75b of FIG. 5. The pedal force characteristic curve 2.2 in FIG. 7 is part of the set-point characteristic curve 2.1 for $U_{SK,soll}$. As can be seen, a piston rod travel is immediately specified, in order to initiate a rapid generation of pressure in the brake system. At the same time, the pedal force is fed back more strongly.

Between the extremes described above, corresponding curve courses are stored in memory in the performance graphs elements 75a and 75b.

The ascertained set-point value $U_{SK,soll}$ for the master cylinder piston 8 embodied as a servo piston is present in the form of the value $U_{SK,soll}$ at a summation point 76, FIG. 3. At this summation point 76, the set-point value $U_{SK,soll}$ is compared with the actual value $U_{SK,ist}$ of the inductive transducer 50. A control deviation e reaches a controller 80, in which a signal for the magnetic valve 62 is generated.

This is not exclusively a linear controller, because nonlinearities of the valves 61 and 62 must also be taken into account.

The valve 62 now allows a volume flow $\dot{v}$ to pass through, which is drawn from the reservoir 64 at the reservoir pressure p. This volume flow $\dot{v}$ reaches the servo piston chamber 12 and moves the master cylinder piston 8, which covers a servo piston travel $S_{SK}$. The servo piston travel $S_{SK}$ is returned to the summation point 76 via the inductive transducer 50, as described above, for comparison with the set-point value $U_{SK,soll}$.

On the other side, the advancing master cylinder piston 8 generates a positive displacement of volume in the brake chamber 27, which leads to the generation of the desired brake pressure in the brake line 29. The corresponding brake pressure $p_B$ is coupled with the servo piston pressure $p_{SK}$ via the area ratio at the master cylinder piston 8. In the followup boosters typical at the present time, the servo piston pressure $p_{SK}$ acts directly on the face of the piston rod 3.

Figure 2:
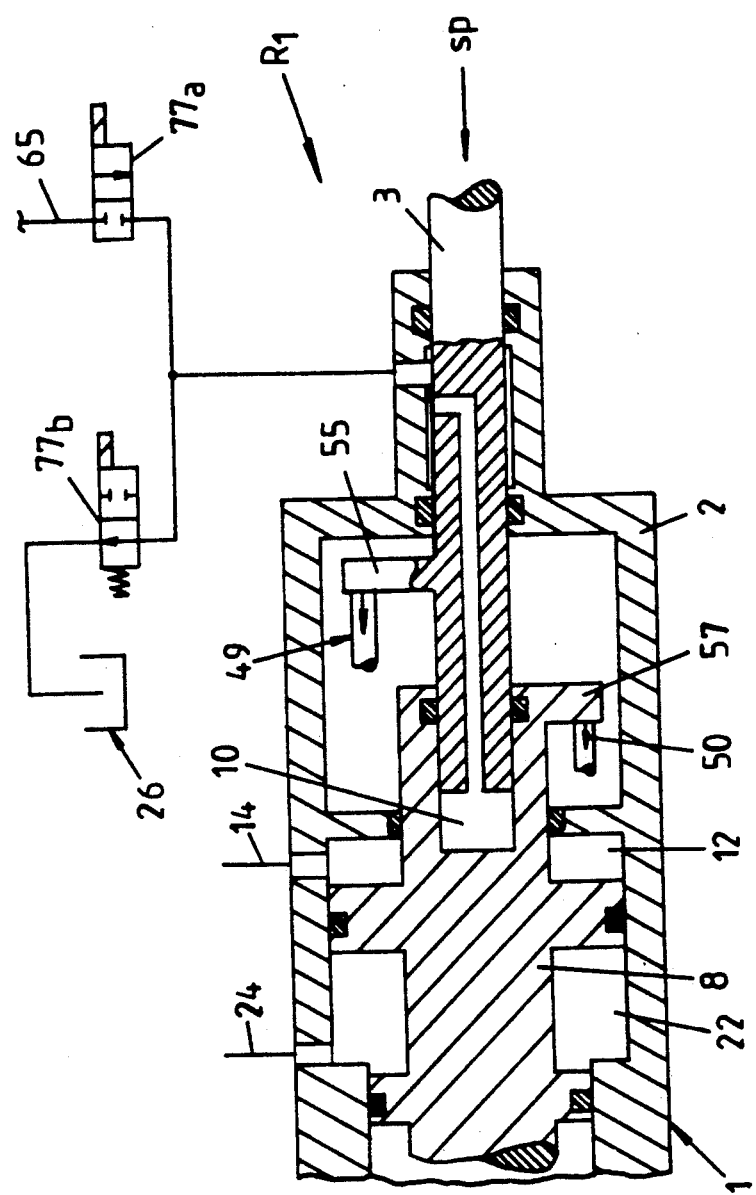
FIG. 2 is a longitudinal section through a further exemplary embodiment of a booster, with a portion of a brake system shown in a block diagram.

In the present case, for the sake of greater freedom in embodiment and design of a pedal force—with respect to the pedal travel characteristic curve—an electrically triggerable pressure controller 77 is incorporated between the inlet line 14 and the chamber 10. Suitable longitudinal bores 78 and radial bores 79 are provided in the tappet 6 and piston rod 3, respectively. The task of this pressure controller 77 is, as a function of the pedal travel s, which is represented by the voltage $U_s$ and its chronological derivatives, to transmit the servo pressure or reservoir pressure back onto the brake pedal. Alternatively, the reservoir pressure can be decreased via the valve 77a, FIG. 2.

In this way it is possible, for instance via the first 4 to 8 mm of the travel of the piston rod 3 (the pedal travel is defined by the lever ratio), to decouple the servo piston pressure; thus a practical constant force is fed back to the driver's foot. Next, the servo piston pressure can be fed back to the piston rod 3 proportionally, or stepped up or down as a function of a characteristic curve. This is the task of the corresponding control unit belonging to the pressure controller 77.

The present invention also enables a simple realization of a quick speed-change. This quick speed-change means that in the event of servo failure, as high brake pressure as possible is to be attained with the master brake cylinder, which leads to small master brake cylinder diameters. Contrarily, in normal servo operation, as large a brake volume (brake energy) as possible should be available, and in that case a large diameter of the master brake cylinder or a long pedal travel would be desirable. By means of the present invention, a gradual braking startup takes place only at relatively low brake pressures. This makes it possible for the master cylinder piston, after traveling through this range, to move faster, via a suitable performance graph element in the electronic system. As a result, once again, a larger brake volume is displaced than would actually be specified by the piston rod 3. In the case of servo failure (emergency operation), contrarily, the master cylinder piston executes only the travel equivalent to the rod travel. It is therefore sufficient for the diameter of the master cylinder piston, in the present exemplary embodiment, to be designed for emergency operation, or in other words to have a small diameter. For the servo operation, a correspondingly longer stroke must merely be provided at the master cylinder piston, and this longer stroke then corresponds to the speed-change jump.

The foregoing relate to preferred exemplary embodiments of the invention, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. A brake system having a master brake cylinder embodied as an electrohydraulic booster, a brake pedal, a piston rod which is actuated by said brake pedal, said master brake cylinder communicates via said piston rod with said brake pedal, said piston rod acts upon at least one master cylinder piston via which at least one brake chamber can be put at brake pressure, so that brake fluid flows via brake lines to corresponding wheel brake cylinders, a servo piston chamber associated with the master cylinder piston, said servo piston chamber communicates via an inlet line (14) and a control element with an apparatus for supplying power brake fluid to said servo piston chamber wherein said control element is controlled via a first travel transducer that detects the motion of the piston rod, and a second travel transducer associated with said master cylinder piston which likewise controls said control element via an electronic system, in which the pedal travel (sp) is convertible into a voltage ($U_{sp}$) in said first travel transducer (49), and after processing in a first control unit (72) said voltage ($U_{sp}$) is present as a set-point value ($U_{SK,soll}$) for the master cylinder piston (8) at a summation point (76), at which said set-point value is compared with an actual voltage value ($U_{SK,ist}$) by the travel transducer (50).

2. A brake system as defined by claim 1, in which said summation point (76) is sensed by a controller (80), which triggers said control element (61, 62).

3. A brake system as defined by claim 1, in which said piston rod (3) extends into said master cylinder piston (8) and there forms a variable-volume chamber (10), which via a triggerable pressure controller (77) communicates with said inlet line (14) for power brake fluid.

4. A brake system as defined by claim 2, in which said piston rod (3) extends into said master cylinder piston (8) and there forms a variable-volume chamber (10), which via a triggerable pressure controller (77) communicates with said inlet line (14) for power brake fluid.

5. A brake system as defined by claim 3, in which said chamber (10) can be relieved via said pressure controller (77) to a supply tank (26).

6. A brake system as defined by claim 4, in which said chamber (10) can be relieved via said pressure controller (77) to a supply tank (26).

7. A brake system as defined by claim 3, in which communication with said pressure controller (77) is established via a corresponding longitudinal bore (78) and radial bore (79) in said piston rod.

8. A brake system as defined by claim 4, in which communication with said pressure controller (77) is established via a corresponding longitudinal bore (78) and radial bore (79) in said piston rod.

9. A brake system as defined by claim 5, in which communication with said pressure controller (77) is established via a corresponding longitudinal bore (78) and radial bore (79) in said piston rod.

10. A brake system as defined by claim 6, in which communication with said pressure controller (77) is established via a corresponding longitudinal bore (78) and radial bore (79) in said piston rod.

11. A brake system as defined by claim 1, in which said first control unit (72) comprises at least one differentiator (73a, 73b) and at least one performance graph element (75a, 75b), wherein said first control unit (72) converts said piston ($U_{sp}$) in linear fashion and after differentiation once or twice via nonlinear performance graphs into a set-point value ($U_{SK,soll}$) for a chronological course of said master cylinder piston travel and the triggering of the pressure controller (77).

12. A brake system as defined by claim 2, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value ($U_{SK,soll}$) for a chronological course of said master cylinder piston travel and the triggering of the pressure controller (77).

13. A brake system as defined by claim 3, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value ($U_{SK,soll}$) for a chronological course of said master cylinder piston travel and the triggering of the pressure controller (77).

14. A brake system as defined by claim 4, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value ($U_{SK,soll}$) for a chronological course of said master cylinder piston travel and the triggering of the pressure controller (77).

15. A brake system as defined by claim 5, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value ($U_{SK,soll}$) for a chronological course of said master cylinder piston travel and the triggering of the pressure controller (77).

16. A brake system as defined by claim 7, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value ($U_{SK,soll}$) for a chronological course of said master cylinder piston travel and the triggering of the pressure controller (77).

17. A brake system as defined by claim 11, in which said performance graph element (75a, 75b), are embodied such that in fast braking startup high pressure is fed in immediately, and the pedal force is immediately fed back more strongly.

18. A brake system as defined by claim 1, in which said performance graph elements (75a, 75b) are embodied such that in fast braking startup high pressure is fed in immediately, and the pedal force is immediately fed back more strongly.

19. A brake system as defined by claim 2, in which said performance graph element (75a, 75b), are embodied such that in fast braking startup high pressure is fed in immediately, and the pedal force is immediately fed back more strongly.

20. A brake system as defined by claim 3, in which said performance graph element (75a, 75b), are embodied such that in fast braking startup high pressure is fed in immediately, and the pedal force is immediately fed back more strongly.

21. A brake system as defined by claim 1, in which said piston rod (3) extends into said master cylinder piston (8) and there forms a variable-volume chamber (10), which via a triggerable pressure controller (77) communicates with said inlet line (14) for power brake fluid and with a connecting line (65) to a pressure reservoir (64).

22. A brake system as defined by claim 2, in which said piston rod (3) extends into said master cylinder piston (8) and there forms a variable-volume chamber (10), which via a triggerable pressure controller (77) communicates with said inlet line (14) for power brake fluid and with a connecting line (65) to a pressure reservoir (64).

23. A brake system as defined by claim 21, in which said chamber (10) can be relieved via said pressure controller (77) to a supply tank (26).

24. A brake system as defined by claim 22, in which said chamber (10) can be relieved via said pressure controller (77) to a supply tank (26).

25. A brake system as defined by claim 21, in which communication with said pressure controller (77) is established via a corresponding longitudinal bore (78) and radial bore (79) in said piston rod.

26. A brake system as defined by claim 22, in which communication with said pressure controller (77) is established via a corresponding longitudinal bore (78) and radial bore (79) in said piston rod.

27. A brake system as defined by claim 23, in which communication with said pressure controller (77) is established via a corresponding longitudinal bore (78) and radial bore (79) in said piston rod.

28. A brake system as defined by claim 24, in which communication with said pressure controller (77) is established via a corresponding longitudinal bore (78) and radial bore (79) in said piston rod.

29. A brake system as defined by claim 21, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value (USK,soll) for a chronological course of said master cylinder piston travel and the triggering of the pressure controller (77).

30. A brake system as defined by claim 22, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value (USK,soll) for a chronological course of said master cylinder piston travel and the triggering of the pressure controller (77).

31. A brake system as defined by claim 23, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value (USK,soll) for a chronological course of said master cylinder piston travel and the triggering of the pressure controller (77).

32. A brake system as defined by claim 25, in which said first control unit (72) comprises at least one differentiator (73a, 73b) and at least one performance graph element (75a, 75b), wherein said first control unit (72) converts said piston rod signal ($U_{sp}$) in linear fashion and after differentiation once or twice via nonlinear performance graphs into a set-point value (USK,soll) for a chronological course of said master cylinder piston travel and the triggering of the pressure controller (77).

33. A brake system as defined by claim 21, in which said performance graph elements (75a, 75b) are embodied such that in fast braking startup high pressure is fed in immediately, and the pedal force is immediately fed back more strongly.

* * * * *